(12) United States Patent
Huang et al.

(10) Patent No.: US 12,706,537 B2
(45) Date of Patent: Aug. 11, 2026

(54) MULTIPHASE SWITCHING CONVERTER WITH STACKABLE CONTROLLERS

(71) Applicant: Monolithic Power Systems, Inc., Kirkland, WA (US)

(72) Inventors: Daocheng Huang, Santa Clara, CA (US); Fangyu Zhang, Hangzhou (CN); Ming Chen, Hangzhou (CN)

(73) Assignee: Monolithic Power Systems, Inc., Kirkland, WA (US)

( * ) Notice: Subject to any disclaimer, the term of this patent is extended or adjusted under 35 U.S.C. 154(b) by 435 days.

(21) Appl. No.: 18/073,354

(22) Filed: Dec. 1, 2022

(65) Prior Publication Data

US 2024/0186901 A1 Jun. 6, 2024

(51) Int. Cl.
*H02M 3/158* (2006.01)

(52) U.S. Cl.
CPC ....... *H02M 3/1584* (2013.01); *H02M 3/1586* (2021.05)

(58) Field of Classification Search
CPC .......................... H02M 3/1584; H02M 3/1586
See application file for complete search history.

(56) References Cited

U.S. PATENT DOCUMENTS 8,493,044 B2 7/2013 Xu
9,081,397 B2 7/2015 Jiang
9,270,178 B2 2/2016 Jiang
9,407,148 B2 8/2016 Guo
9,912,240 B1 3/2018 Nguyen
9,941,781 B2 4/2018 Hu
10,270,343 B2 4/2019 Nguyen
10,523,106 B2 12/2019 Li
11,081,954 B2 8/2021 Jiang
11,342,848 B2 5/2022 Luo
11,349,383 B2 5/2022 Jiang
11,356,023 B2 6/2022 Jiang
11,387,736 B2 7/2022 Luo
2011/0025284 A1* 2/2011 Xu ...................... H02M 3/1584 327/294
2015/0188406 A1* 7/2015 Nishi .................... H02M 3/156 323/217
2016/0315538 A1* 10/2016 Nguyen .............. H02M 3/1584
2017/0060154 A1* 3/2017 Ozawa ................ H02M 3/1584
2023/0336082 A1* 10/2023 Dai ..................... H02M 1/0009

OTHER PUBLICATIONS

U.S. Appl. No. 17/184,093, filed Sep. 16, 2021, Suhua Luo.
U.S. Appl. No. 17/555,757, filed Aug. 4, 2022, Lijie Jiang.
U.S. Appl. No. 17/570,708, filed Aug. 4, 2022, Lijie Jiang.

* cited by examiner

*Primary Examiner* — Alex Torres-Rivera
(74) *Attorney, Agent, or Firm* — Ashurst Perkins Coie US LLP

(57) ABSTRACT

A controller for a multiphase switching converter has a feedback pin, a reference pin, and a plurality of switching control pins. When the controller is a master controller, the reference pin provides a reference output signal based on a plurality of currents flowing through a plurality of switching circuits. When the controller is a slave controller, the feedback pin receives the reference output signal from the master controller, and the slave controller provides the plurality of switching control signals based on the plurality of currents flowing through the plurality of switching circuits, the reference output signal, and a feedback signal representative of an output voltage of the multiphase switching converter.

10 Claims, 9 Drawing Sheets

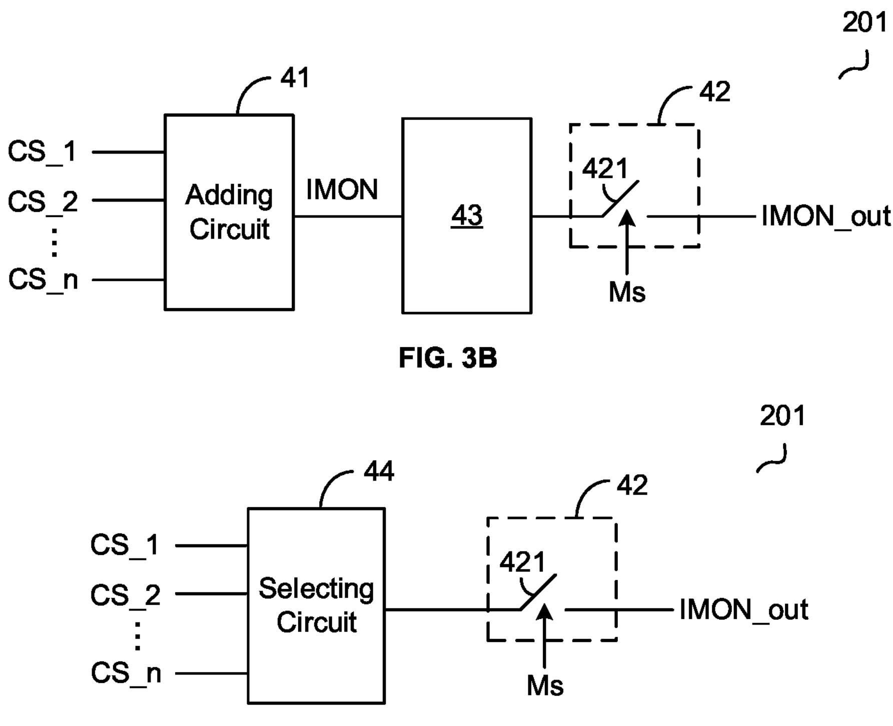
FIG. 3B
FIG. 3C
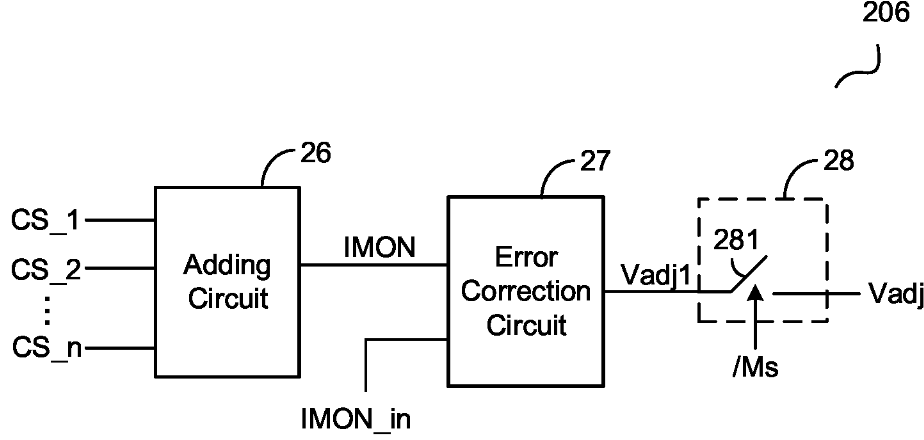
FIG. 4A

MULTIPHASE SWITCHING CONVERTER WITH STACKABLE CONTROLLERS

TECHNICAL FIELD

The present invention generally relates to electronic circuits, and more particularly but not exclusively, to multiphase switching converter.

BACKGROUND OF THE INVENTION

Recently, with emergence of high-performance processors, switching converters with smaller output voltages and larger output currents are needed, with higher and higher requirements on thermal performance and transient response performance. Multiphase switching converters are widely used because of their superior performance. A multiphase switching converter comprises a plurality of switching circuits, each switching circuit forms one phase, and outputs of the plurality of switching circuits are coupled together to provide an output voltage to a load.

Traditionally, the multiphase switching converter needs to provide each phase an individual switching control signal. However, if the phase number is larger than the number of switching control signals a controller could provide, then one switching control signal need to handle two or more phases, which may cause new problems.

SUMMARY OF THE INVENTION

It is one of the objects of the present invention to provide multiphase switching converter, controller and associated control method.

Embodiments of the present invention are directed to a controller for a multiphase switching converter. The multiphase switching converter has a plurality of switching circuits coupled in parallel to provide an output voltage. The controller comprises a first feedback pin, a second feedback pin, a reference pin, and a plurality of switching control pins. The feedback pin is configured to receive a feedback signal representative of the output voltage. The plurality of switching control pins is configured to provide a plurality of switching control signals based on the feedback signal to control the plurality of switching circuits. When the controller is configured as a master controller, the reference pin is configured to provide a reference output signal based on a plurality of currents flowing through the plurality of switching circuits. When the controller is configured as a slave controller, the second feedback pin is coupled to the reference pin of the master controller to receive the reference output signal, and the slave controller is configured to adjust a sum of the plurality of currents flowing through the plurality of switching circuits controlled by the slave controller based on the reference output signal.

Embodiments of the present invention are also directed to a control method for a controller of a multiphase switching converter. The multiphase switching converter has a plurality of switching circuits coupled in parallel to provide an output voltage. The control method comprises receiving a feedback signal representative of the output voltage, and providing a plurality of switching control signals based on the feedback signal to control the plurality of switching circuits. When the controller is configured as a master controller, providing a reference output signal based on a plurality of currents flowing through the plurality of switching circuits. When the controller is configured as a slave controller, receiving the reference output signal from the master controller, and adjusting a sum of the plurality of currents flowing through the plurality of switching circuits controlled by the slave controller based on the reference output signal.

Embodiments of the present invention are further directed to a multiphase switching converter. The multiphase switching converter comprises a first plurality of switching circuits, a second plurality of switching circuits, a master controller and a slave controller. Each of the first and the second plurality of switching circuits is coupled in parallel to provide an output voltage. The master controller has a first feedback pin, a reference pin and a first plurality of switching control pins. The first feedback pin is configured to receive a feedback signal representative of the output voltage. The reference pin is configured to provide a reference output signal based on a plurality of currents flowing through the plurality of switching circuits. The first plurality of switching control pins are configured to provide a first plurality of switching control signals based on the feedback signal to control the first plurality of switching circuits. The slave controller has a second feedback pin, a third feedback pin and a second plurality of switching control pins. The second feedback pin is configured to receive the feedback signal. The third feedback pin is configured to receive the reference output signal from the master controller. The second plurality of switching control pins are configured to provide a second plurality of switching control signals to control the second plurality of switching circuits based on the feedback signal, the reference output signal, and a plurality of currents flowing through the second plurality of switching circuits.

These and other features of the present invention will be readily apparent to persons of ordinary skill in the art upon reading the entirety of this disclosure, which includes the accompanying drawings and claims.

BRIEF DESCRIPTION OF DRAWINGS

The present invention can be further understood with reference to the following detailed description and the appended drawings, wherein like elements are provided with like reference numerals.

FIGS. 3A-3C are schematic diagrams of a reference generating circuit 201 as shown in FIG. 2 in accordance with embodiments of the present invention;

FIGS. 4A-4C are schematic diagrams of a current adjusting circuit 206 as shown in FIG. 2 in accordance with embodiments of the present invention;

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element. When a signal is described as "equal to" another signal, it is substantially identical to the other signal.

Embodiments of the present invention proposes a multiphase switching converter with stackable controllers. At least two controllers can be stacked and work in parallel, one controller is master and others are slave. The master controller is capable of sharing a reference output signal based on a plurality of currents flowing through a plurality of switching circuits controlled by the master controller. The slave controller is capable of receiving the reference output signal shared by the master controller and adjusting a plurality of currents flowing through a plurality of switching circuits controlled by the slave controller based on the reference output signal.

Figure 1:
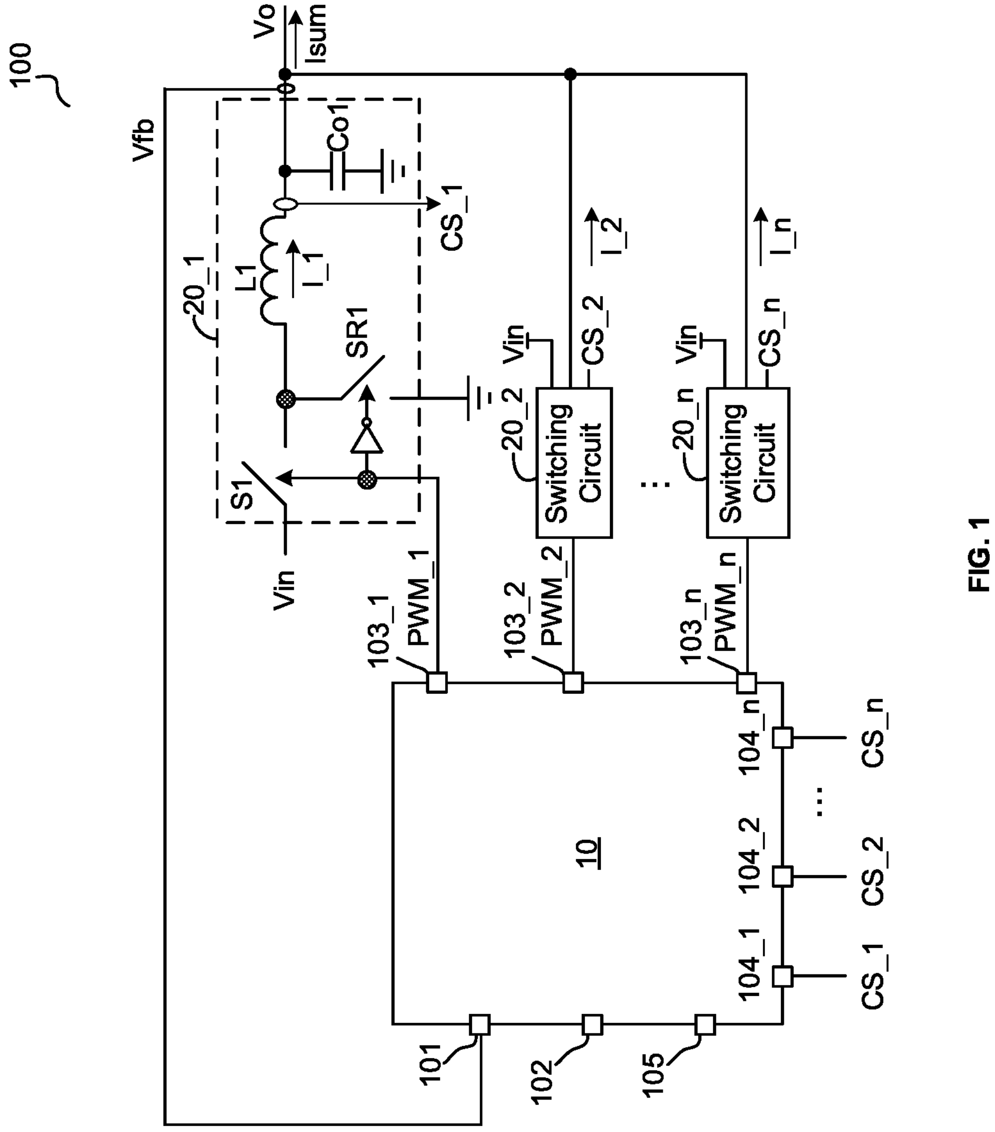
FIG. 1 is a schematic block diagram of a multiphase switching converter 100 in accordance with an embodiment of the present invention.

FIG. 1 is a schematic block diagram of a multiphase switching converter 100 in accordance with an embodiment of the present invention. The multiphase switching converter 100 has a controller 10 and a plurality of switching circuits 20 (e.g., 20_1, 20_2 . . . 20_*n* shown in FIG. 1, where n is an integer greater than or equal to two) coupled in parallel to provide an output voltage Vo from an input voltage Vin. The controller 10 comprises a feedback pin 101, a feedback pin 102, a reference pin 105 and a plurality of switching control pins 103 (e.g., 103_1, 103_2 . . . 103_*n*). The feedback pin 101 is configured to receive a feedback signal Vfb representative of the output voltage Vo. The feedback pin 102 is capable of receiving a reference input signal IMON_in. The reference pin 105 is capable of providing a reference output signal IMON_out. The plurality of switching control pins 103 is configured to provide a plurality of switching control signals PWM (e.g., PWM_1, PWM_2 . . . PWM_n) based on the output voltage Vo to control the plurality of switching circuits 20.

The controller 10 is stackable, such that is capable of co-working with other controllers as a master controller or a slave controller. When the controller 10 is configured as the master controller, the reference pin 105 is configured to provide the reference output signal IMON_out based on a plurality of currents (e.g., I_1, I_2 . . . I_n shown in FIG. 1) flowing through the plurality of switching circuits 20, for example but not limited to, a sum of the plurality of currents flowing through the plurality of switching circuits 20, an average of the plurality of currents flowing through the plurality of switching circuits 20, or at least one of a plurality of currents flowing through the plurality of switching circuits 20. The sum of the plurality of currents flowing through the plurality of switching circuits 20 is a total current Isum provided by the plurality of switching circuits 20. When the controller 10 is configured as the slave controller, the feedback pin 102 is coupled to the reference pin 105 of the master controller to receive the reference output IMON_out from the master controller as the reference input signal IMON_in of the slave controller, and the slave controller 10 is configured to provide the plurality of switching control signals PWM further based on the reference input signal IMON_in (i.e., the reference output signal IMON_out provided by the master controller) and the plurality of currents flowing through the plurality of switching circuits 20. In one embodiment, the controller 10 further has a plurality of current sense pins 104 (e.g., 104_1, 104_2 . . . 104_*n*), to receive a plurality of current sense signals CS (e.g., CS_1, CS_2 . . . CS_n) representative of the plurality of currents flowing through the plurality of switching circuits 20. One with ordinary skill in the art should understand that switching circuits 20 can employ any suitable topology, such as synchronous or asynchronous step-up/step-down converters, forward converters, flyback converters, and so on. FIG. 1 shows one example of the switching circuit 20_1 for illustration. In FIG. 1, switching circuit 20_1 has a high-side switch S1, a low-side switch SR1, an inductor L1, and an output capacitor Co1. The high-side switch S1 and the low-side switch SR1 are turned on complementary under control of the switching control signal PWM_1. The current I_1 flowing through the switching circuit 20_1 may be a current flowing through the inductor L1, a current flowing through the high-side switch S1 or a current flowing through the low-side switch SR1.

Figure 2:
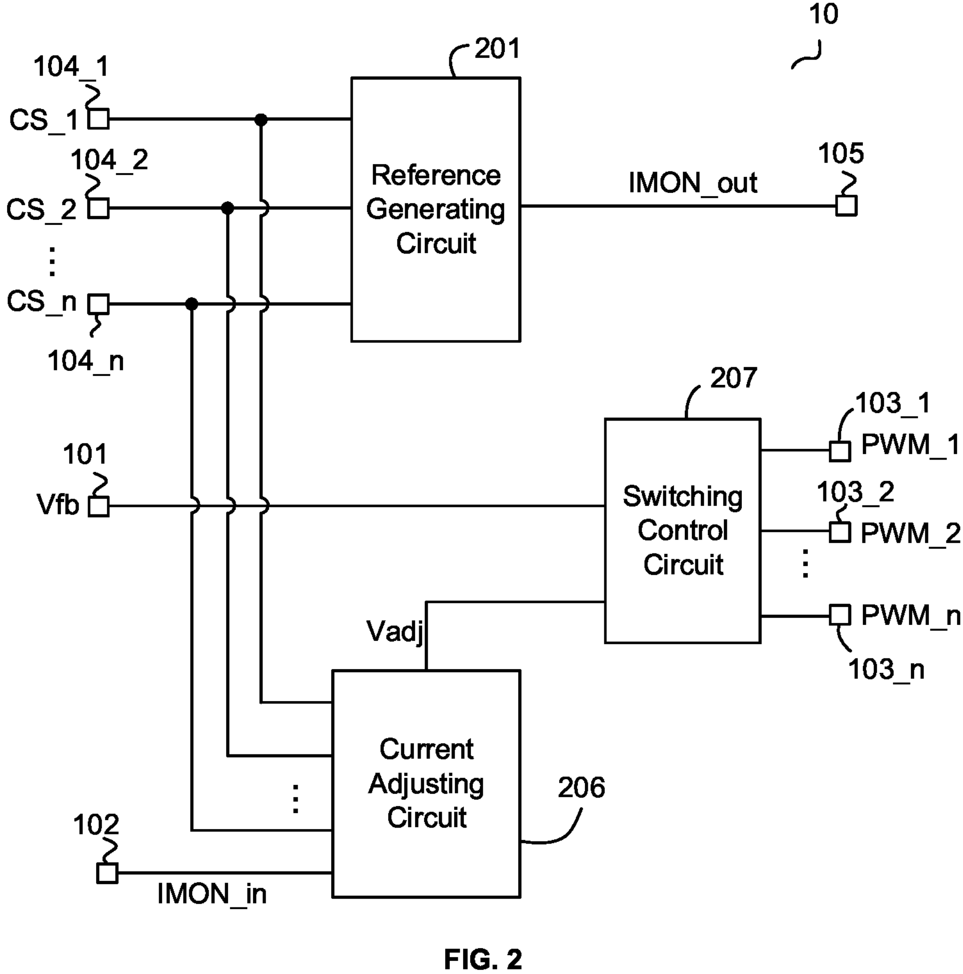
FIG. 2 is a schematic diagram of a controller 10 shown in FIG. 1 in accordance with an embodiment of the present invention.

FIG. 2 is a schematic diagram of the controller 10 shown in FIG. 1 in accordance with an embodiment of the present invention. In one embodiment, the controller 10 comprises a reference generating circuit 201, a current adjusting circuit 206, and a switching control circuit 207.

When the controller 10 is configured as the master controller, the reference generating circuit 201 provides the reference output signal IMON_out based on the plurality of current sense signals CS, for example but not limited to, based on one of the plurality of current sense signals CS, a sum of the plurality of current sense signals CS, or an average of the plurality of current sense signals CS. When the controller 10 is configured as the slave controller, the current adjusting circuit 206 provides a current adjusting signal Vadj based on the reference input signal IMON_in (i.e., the reference output signal IMON_out provided by the master controller) and the plurality of current sense signals CS, for example but not limited to, based on a difference between a sum of the plurality of current sense signals CS and the reference input signal IMON_in. The switching control circuit 207 receives the feedback signal Vfb and the current adjusting signal Vadj, and provides switching control signals PWM to turn on the plurality of switching circuits 20 in sequence based on the feedback signal Vfb and the current adjusting signal Vadj. When the controller 10 is configured as the master controller, the current adjusting circuit 206 does not work, and the current adjusting signal Vadj is blanked.

With embodiments of present invention, several controllers 10 could be stackable, such that each switching circuit 20 could be driven by one individual switching control signal PWM, while current balance could be achieved easily.

Figure 3A:
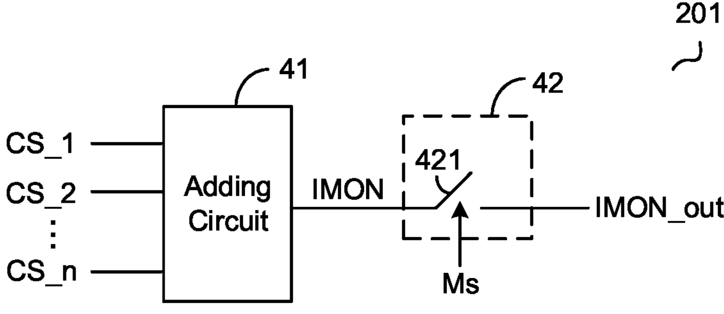

FIG. 3A is a schematic diagram of the reference generating circuit 201 as shown in FIG. 2 in accordance with an embodiment of the present invention. In the embodiment shown in FIG. 3A, the reference generating circuit 201 comprises an adding circuit 41 and an output circuit 42. The adding circuit 41 provides a sum signal IMON based on the sum of the plurality of current sense signals CS_1, CS_2 . . . CS_n. The output circuit 42 receives the sum signal IMON and provides the reference output signal IMON_out based on the sum signal IMON when the controller 10 is configured as the master controller. The output circuit 42 may comprises a switch 421. When an indicating signal Ms indicates that the controller 10 is the master controller, then the switch 421 is turned on to provide the reference output signal IMON_out, otherwise, the switch 421 is turned off. One with ordinary skill in the art should understand that the output circuit 42 is not limited by FIG. 3A, a gate circuit, a buffer, a blanking circuit, or any other suitable circuit may also be employed.

FIG. 3B is a schematic diagram of the reference generating circuit 201 as shown in FIG. 2 in accordance with another embodiment of the present invention. The reference generating circuit 201 shown in FIG. 3B further comprises an averaging circuit 43, to provide the reference output signal IMON_out based on an average of the plurality of current sense signals CS when the controller 10 is configured as the master controller. FIG. 3C is a schematic diagram of the reference generating circuit 201 as shown in FIG. 2 in accordance with another embodiment of the present invention. The reference generating circuit 201 shown in FIG. 3C comprises a selecting circuit 44 and the output circuit 42, to provide the reference output signal IMON_out based on at least one of the plurality of current sense signals CS when the controller 10 is configured as the master controller. One with ordinary skill in the art should understand that the detailed structure of the reference generating circuit 201 is not limited by FIG. 3A-3C, other suitable circuit may also be employed.

FIG. 4A is a schematic diagram of the current adjusting circuit 206 as shown in FIG. 2 in accordance with an embodiment of the present invention. In the example of FIG. 4A, the current adjusting circuit 206 comprises an adding circuit 26, an error correction circuit 27, and an output circuit 28. The adding circuit 26 provides the sum signal IMON based on the sum of the plurality of current sense signals CS_1, CS_2 . . . CS_n. In one embodiment, the adding circuit 26 is the adding circuit 41, that is the reference generating circuit 201 and the current adjusting circuit 206 shares the same adding circuit. The error correction circuit 27 provides a current adjusting signal Vadj1 based on the sum signal IMON and the reference input signal IMON_in. The output circuit 28 provides the current adjusting signal Vadj1 as the current adjusting signal Vadj when the controller 10 is configured as the slave controller. The output circuit 28 may comprises a switch 281. When the indicating signal Ms indicates that the controller 10 is the slave controller, then the switch 281 is turned on to provide the current adjusting signal Vadj, otherwise, the switch 281 is turned off. One with ordinary skill in the art should understand that the output circuit 28 is not limited by FIG. 4A, a gate circuit, a buffer, a blanking circuit, or any other suitable circuit may also be employed.

Figure 4B:
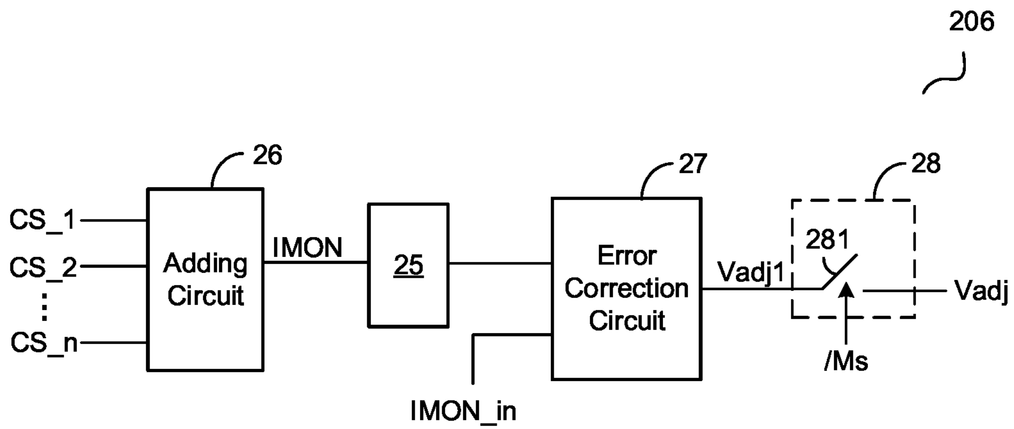
Figure 4C:
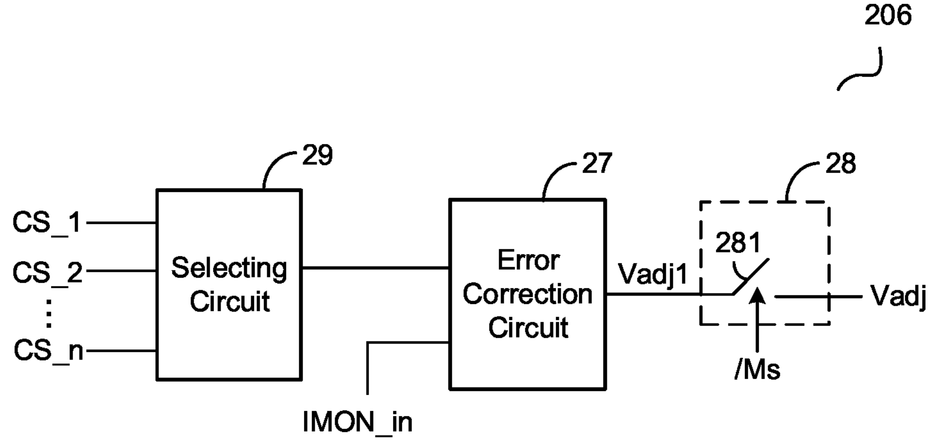

FIG. 4B is a schematic diagram of the current adjusting circuit 206 as shown in FIG. 2 in accordance with another embodiment of the present invention. The current adjusting circuit 206 shown in FIG. 4B further comprises an averaging circuit 25, to provide the current adjusting signal Vadj based on an average of the plurality of current sense signals CS when the controller 10 is configured as the slave controller. FIG. 4C is a schematic diagram of the current adjusting circuit 206 as shown in FIG. 2 in accordance with another embodiment of the present invention. The current adjusting circuit 206 shown in FIG. 4C comprises a selecting circuit 29, the error correction circuit 27 and the output circuit 28, to provide the current adjusting signal Vadj based on at least one of the plurality of current sense signals CS when the controller 10 is configured as the slave controller. One with ordinary skill in the art should understand that the detailed structure of the current adjusting circuit 206 is not limited by FIG. 4A-4C, other suitable circuit may also be employed.

Figure 5:
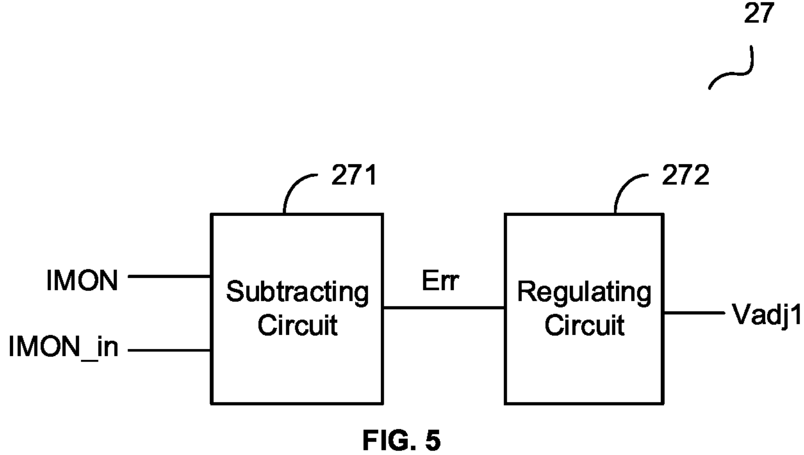
FIG. 5 is a schematic diagram of an error correction circuit 27 in accordance with an embodiment of the present invention.

FIG. 5 is a schematic diagram of the error correction circuit 27 with an embodiment of the present invention. In the embodiment shown in FIG. 5, the error correction circuit 27 comprises a subtracting circuit 271 and a regulating circuit 272. The subtracting circuit 271 receives the sum signal IMON and the reference input signal IMON_in, and provides an error signal Err based on the difference between the reference input signal IMON_in and the sum signal IMON. The regulating circuit 272 receives the error signal Err and provides the current regulating signal Vadj1 based on the error signal Err. The regulating circuit 272 may be a PI (Proportional and integrator) circuit or other suitable regulating circuit.

Figure 6:
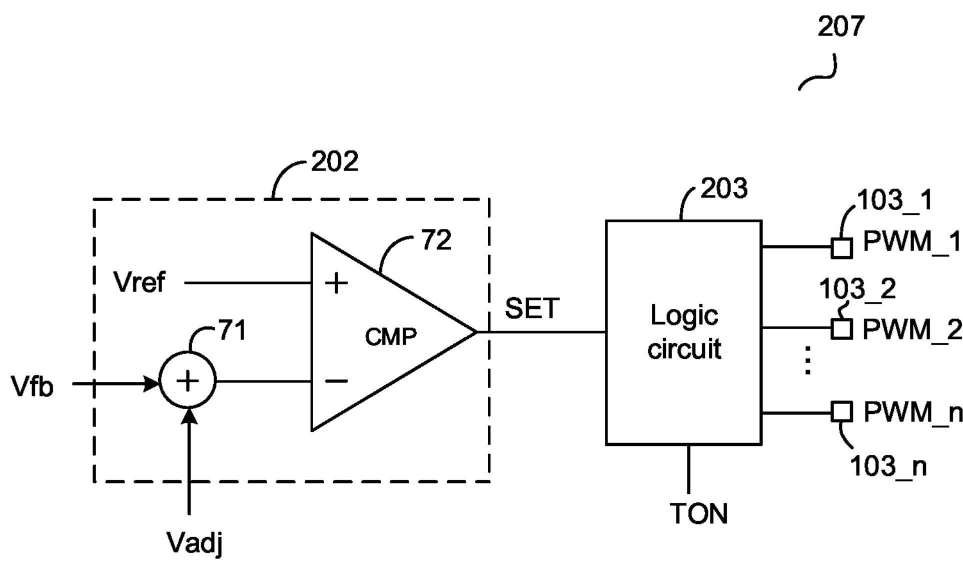
FIG. 6 is a schematic diagram of a switching control circuit 207 as shown in FIG. 2 in accordance with an embodiment of the present invention.

FIG. 6 is a schematic diagram of the switching control circuit 207 as shown in FIG. 2 in accordance with an embodiment of the present invention. In the embodiment shown in FIG. 6, the switching control circuit 207 comprises a set signal generating circuit 202 and a logic circuit 203. The set signal generating circuit 202 provides a set signal SET in response to the feedback signal Vfb, the current adjusting signal Vadj and a voltage reference signal Vref representative of a target output voltage. In one embodiment, when the controller 10 is configured as the master controller, the current adjusting signal Vadj does not take effect, e.g., is blanked or equals zero, and the set signal generating circuit 202 provides the set signal SET in response to the feedback signal Vfb and the voltage reference signal Vref. The logic circuit 203 is coupled to the set signal generating circuit 202 to receive the set signal SET, and the logic circuit 203 provides switching control signals PWM to control the switching circuits 20 based on the set signal SET and an ON-time control signal TON, such that the plurality of switching circuits 20 are turned on in sequence in response to the set signal SET, and each of the plurality of switching circuits 20 is turned off respectively based on the ON-time control signal TON. In one embodiment, if the controller 10 is configured as the master controller, then the logic circuit 203 is configured to turn on one of the switching circuits 20 when the feedback signal Vfb is less than the voltage reference signal Vref. In another embodiment, if the controller 10 is configured as the slave controller, then the logic circuit 203 is configured to turn on one of the switching circuits 20 when a sum of the feedback signal Vfb and the current adjusting signal Vadj is less than the voltage reference signal Vref. In one embodiment, the logic circuit 203 is configured to turn off a corresponding switching circuit 20_*i* when an ON-time period of the corresponding switching circuit 20_*i* reaches a time threshold determined by the ON-time control signal TON. The time threshold may be constant, or may vary with the input voltage Vin and/or the output voltage Vo. In one embodiment, the time threshold is further adjusted based on the current I_i flowing through the corresponding switching circuit 20_*i*.

In the example shown in FIG. 6, the set signal generating circuit 202 comprises an operation circuit 71 and a comparator 72. The operation circuit 71 receives the feedback signal Vfb and the current adjusting signal Vadj, and provides the sum of the feedback signal Vfb and the current adjusting signal Vadj. The comparator 72 compares the sum of the feedback signal Vfb and the current adjusting signal Vadj with the voltage reference signal Vref, and provides the set signal SET accordingly. One with ordinary skill in the art should also understand that the current adjusting signal Vadj may also be subtracted from the voltage reference signal Vref. One with ordinary skill in the art should understand that the detailed circuit structure of the set signal generating circuit 202 is not limited by FIG. 6, other suitable circuit may also be employed.

Figure 7:
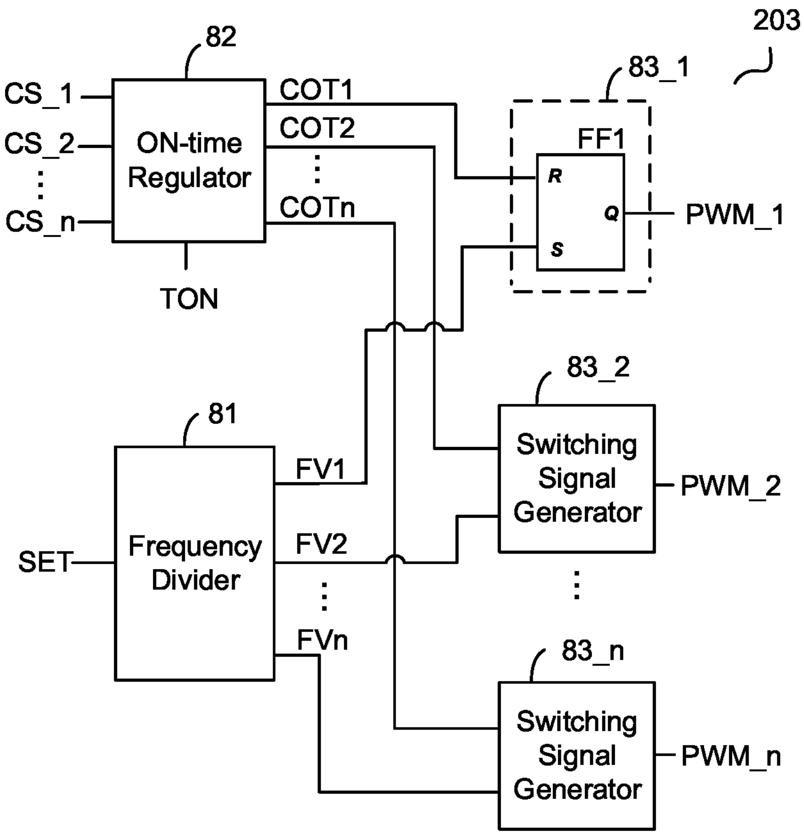
FIG. 7 is a schematic diagram of a logic circuit 203 as shown in FIG. 6 in accordance with an embodiment of the present invention.

FIG. 7 is a schematic diagram of the logic circuit 203 as shown in FIG. 6 in accordance with an embodiment of the present invention. One with ordinary skill in the art should understand that FIG. 7 is one example of the logic circuit 203, other suitable circuit could also be employed. As shown in FIG. 7, the logic circuit 203 comprises a frequency divider 81, an ON-time regulator 82, and a plurality of switching signal generators 83 (e.g., 83_1, 83_2 . . . 83_*n*). The frequency divider 81 receives the set signal SET, and distributing pulses of the set signal SET to a plurality of frequency division signals FV (e.g., FV1, FV2 . . . FVn) via frequency division. The ON-time regulator 82 receives the ON-time control signal TON, and provides a plurality of time thresholds COT (e.g., COT1, COT2 . . . COTn) based on the ON-time control signal TON and the plurality of current sense signals CS. In one embodiment, when an ON-time period of the switching circuit 20_*i* reaches the time threshold COTi, then the switching circuit 20_*i* is turned off by the switching control signal PWMi.

In one embodiment, the plurality of time thresholds COT equals with each other. In another embodiment, each of the plurality of time thresholds COT is used to adjust the ON-time period of one of the plurality of switching circuits 20 based on a current flowing through the one of the plurality of switching circuits 20, such that the controller 10 could control the ON-time period of each switching circuit 20 individually to balance the current flowing through each switching circuit 20. Each switching signal generator 83 provides one of the plurality of switching control signals PWM based on one of the plurality of frequency division signals FV and one of the plurality of time thresholds COT.

In one embodiment, each switching signal generator 83_*i* comprises a flip flop. FIG. 7 takes the switching signal generator 83_1 as one example for illustration. The switching signal generator 83_1 comprises a flip flop FF1. The flip flop FF1 has a set terminal S coupled to the frequency divider 81 to receive the frequency division signal FV1, a reset terminal R coupled to the ON-time regulator 82 to receive the time threshold COT1, and an output terminal Q to provide the switching control signal PWM1.

Figure 8:
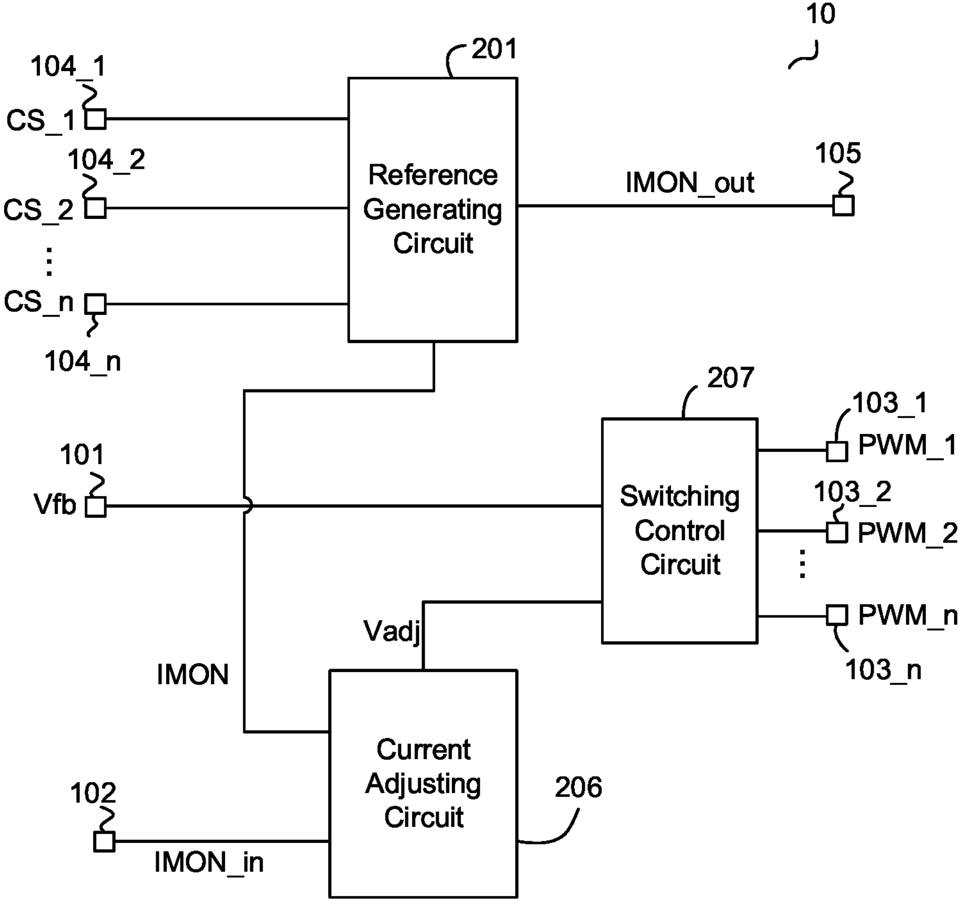
FIG. 8 is a schematic diagram of the controller 10 in accordance with another embodiment of the present invention.

FIG. 8 is a schematic diagram of the controller 10 in accordance with another embodiment of the present invention. In FIG. 8, the current adjusting circuit 206 receives the sum signal IMON from the reference generating circuit 201.

Figure 9:
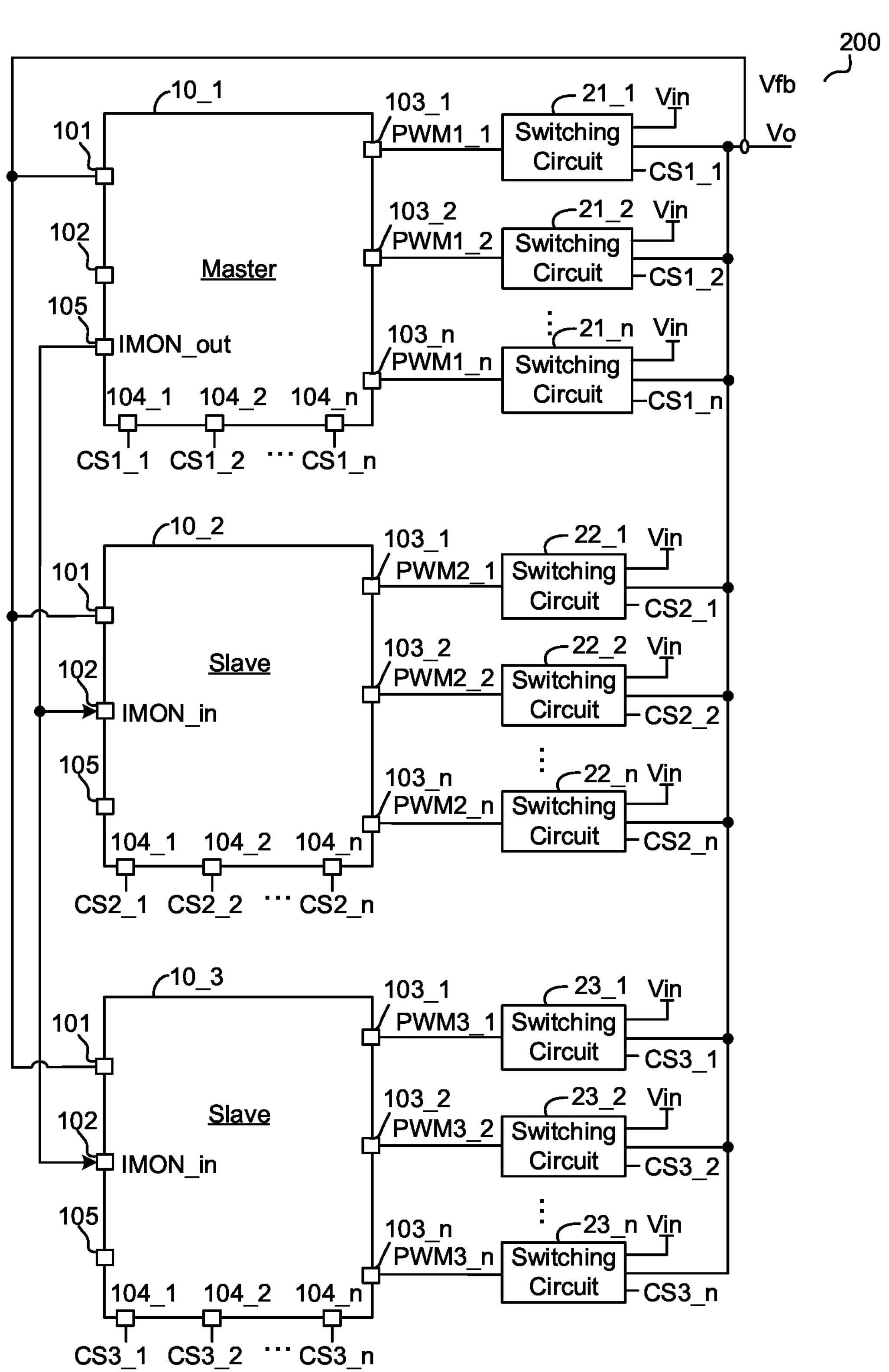
FIG. 9 is a schematic block diagram of a multiphase switching converter 200 in accordance with an embodiment of the present invention.

FIG. 9 is a schematic block diagram of a multiphase switching converter 200 in accordance with an embodiment of the present invention. The multiphase switching converter 200 comprises a plurality of switching circuits 21 (e.g., 21_1, 21_2 . . . 21_*n*), a plurality of switching circuits 22 (e.g., 22_1, 22_2 . . . 22_*n*), a plurality of switching circuits 23 (e.g., 23_1, 23_2 . . . 23_*n*), a controller 10_1, a controller 10_2, and a controller 10_3. In the embodiment of FIG. 9, the controller 10_1 is configured as the master controller, the controllers 10_2 and 10_3 are configured as the slave controllers. Although the embodiment of FIG. 9 shows one master controller and two slave controllers as one example, one with ordinary skill in the art should understand that the multiphase switching converter 200 may comprise more or less slave controllers, not limited by the embodiment of FIG. 9.

Each of the plurality of switching circuits 21-23 are coupled in parallel with each other to provide the output voltage Vo. The master controller 10_1 is configured to provide a plurality of switching control signals PWM1 (e.g., PWM1_1, PWM1_2 . . . PWM1_*n*) via the plurality of switching control pins 103 of the master controller 10_1 based on the output voltage Vo to control the plurality of switching circuits 21. The master controller 10_1 is configured to provide the reference output signal IMON_out via the reference pin 105 of the master controller 10_1 based on a plurality of currents flowing through the plurality of switching circuits 21. The slave controller 10_2 and 10_3 are configured to receive the reference output signal IMON_out provided by the master controller 10_1 as the reference input signal IMON_in via the feedback pin 102. The slave controller 10_2 is configured to provide a plurality of switching control signals PWM2 (e.g., PWM2_1, PWM2_2 . . . PWM2_*n*) via the plurality of switching control pins 103 of the slave controller 10_2 to control the plurality of switching circuits 22 based on the output voltage Vo, the reference input signal IMON_in, and a plurality of currents flowing through the plurality of switching circuits 22. The slave controller 10_3 is configured to provide a plurality of switching control signals PWM3 (e.g., PWM3_1, PWM3_2 . . . PWM3_*n*) via the plurality of switching control pins 103 of the slave controller 10_3 to control the plurality of switching circuits 23 based on the output voltage Vo, the reference input signal IMON_in, and a plurality of currents flowing through the plurality of switching circuits 23. Detailed circuit structure of the master controller 10_1 and the slave controller 10_2 and 10_3 are described above as the controller 10 shown in FIGS. 1-8.

With embodiments of present invention, current balance between switching circuits controlled by different controller could be achieved easily. Such as a total current provided by the switching circuits 21, a total current provided by the switching circuits 22, and a total current provided by the switching circuits 23 are balanced with each other.

Figure 10:
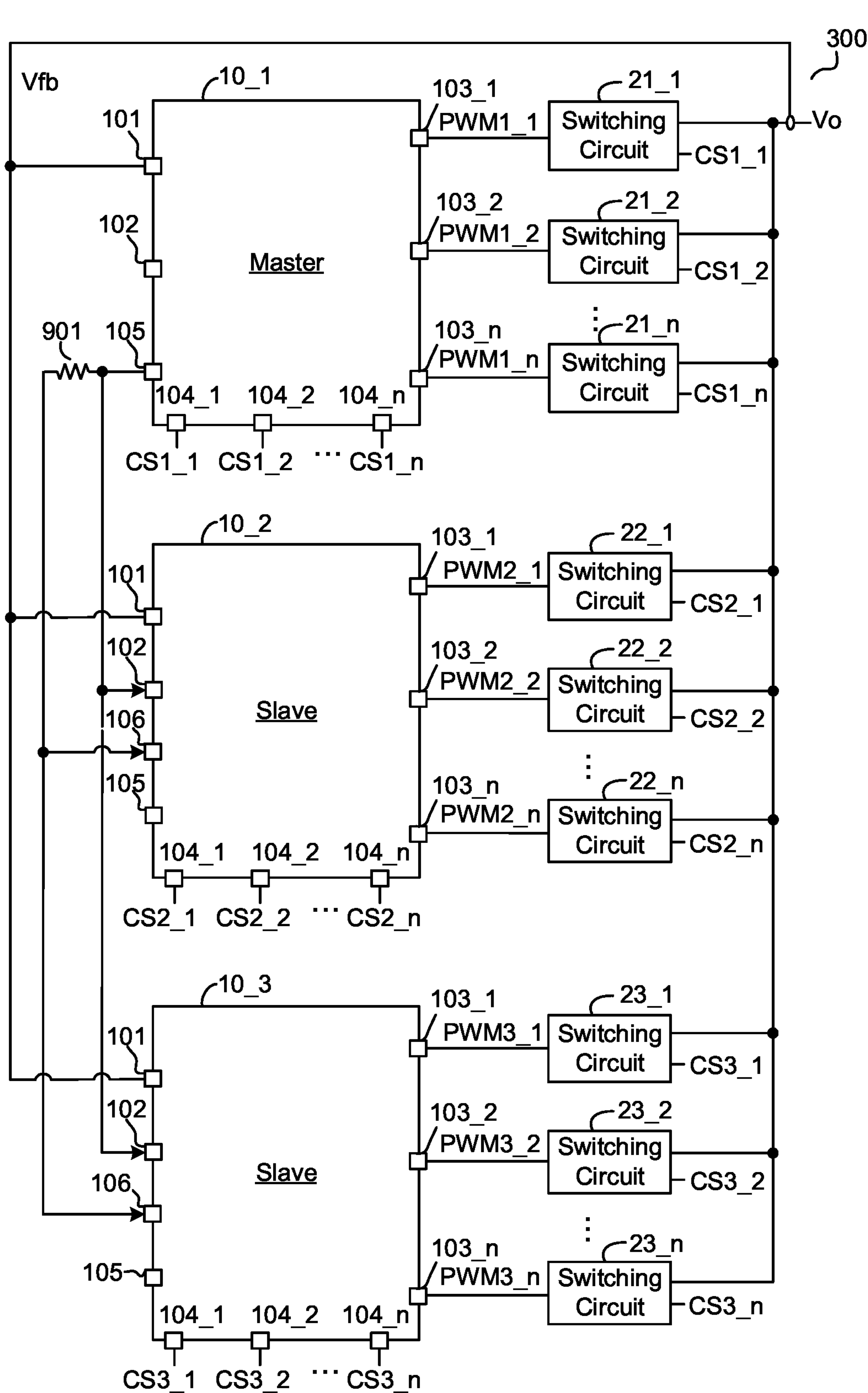
FIG. 10 is a schematic block diagram of a multiphase switching converter 300 in accordance with an embodiment of the present invention.

FIG. 10 is a schematic block diagram of a multiphase switching converter 300 in accordance with an embodiment of the present invention. As shown in FIG. 10, the reference pin 105 of the master controller 10_1 is coupled to a resistor 901 to generate the reference output signal IMON_out across the resistor 901. Each of the slave controller 10_2 and 10_3 further comprises a reference ground pin 106. The feedback pins 102 of the slave controller 10_2 and 10_3 are coupled to a first terminal of the resistor 901 and the reference pin 105 of the master controller 10_1, and the reference ground pins 106 of the slave controller 10_2 and 10_3 are coupled to a second terminal of the resistor 902.

Figure 11:
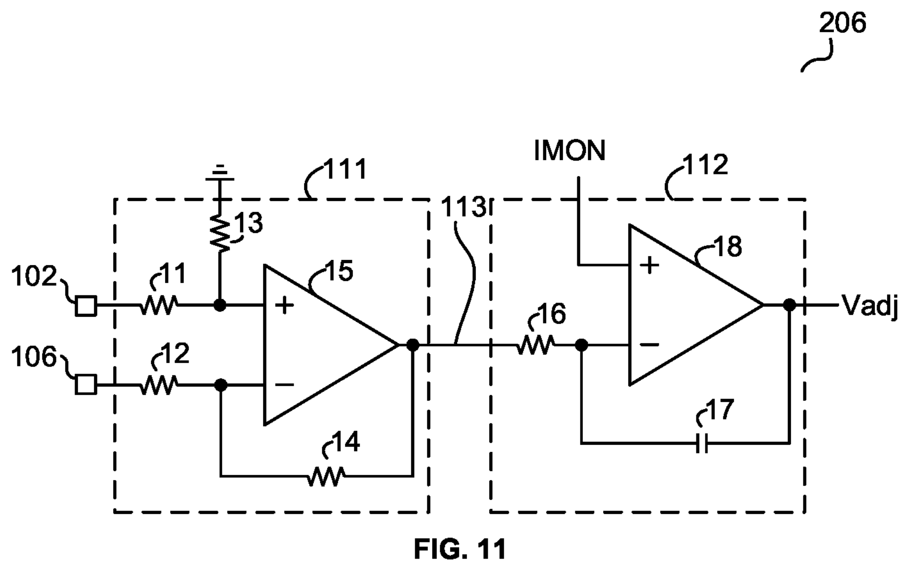
FIG. 11 is a schematic diagram of the current adjusting circuit 206 employed by slave controllers 10_2 and 10_3 shown in FIG. 10 in accordance with another embodiment of the present invention.

FIG. 11 is a schematic diagram of the current adjusting circuit 206 employed by the slave controllers 10_2 and 10_3 shown in FIG. 10 in accordance with another embodiment of the present invention. In the example of FIG. 11, the current adjusting circuit 206 is coupled to the feedback pin 102 and the reference ground pin 106, and configured to provide the current adjusting signal Vadj based on a differential voltage across the resistor 901 and the plurality of current sense signals CS2 or CS3, to balance a sum of the plurality of currents flowing through the switching circuits 22 or 23 with a sum of the plurality of currents flowing through the switching circuits 21. As shown FIG. 11, the current adjusting circuit 206 comprises a differential circuit 111 and a compensation network 112. The differential circuit 111 has a first input terminal coupled to the feedback pin 102 of the slave controller 10_2, a second input terminal coupled to the reference ground pin 106 of the slave controller 10_2, and an output terminal 113. In one embodiment, the differential circuit 111 comprises an amplifier 15. The amplifier 15 has a non-inverting terminal coupled to the feedback pin 102 via a resistor 11, an inverting terminal coupled to the reference ground pin 106 via a resistor 12, and an output terminal coupled to the output terminal 113. The inverting terminal of the amplifier 15 is coupled to the output terminal 113 via a resistor 14. The non-inverting terminal of the amplifier 15 is coupled to a ground via a resistor 13. The compensation network 112 comprises an amplifier 18. The amplifier 18 has a non-inverting terminal configured to receive the sum signal IMON, an inverting terminal coupled to the output terminal 113 via a resistor 16, and an output terminal configured to provide the current adjusting signal Vadj. The inverting terminal of the amplifier 18 is coupled to the output terminal of the amplifier 18 via a capacitor 17 as an example.

Figure 12:
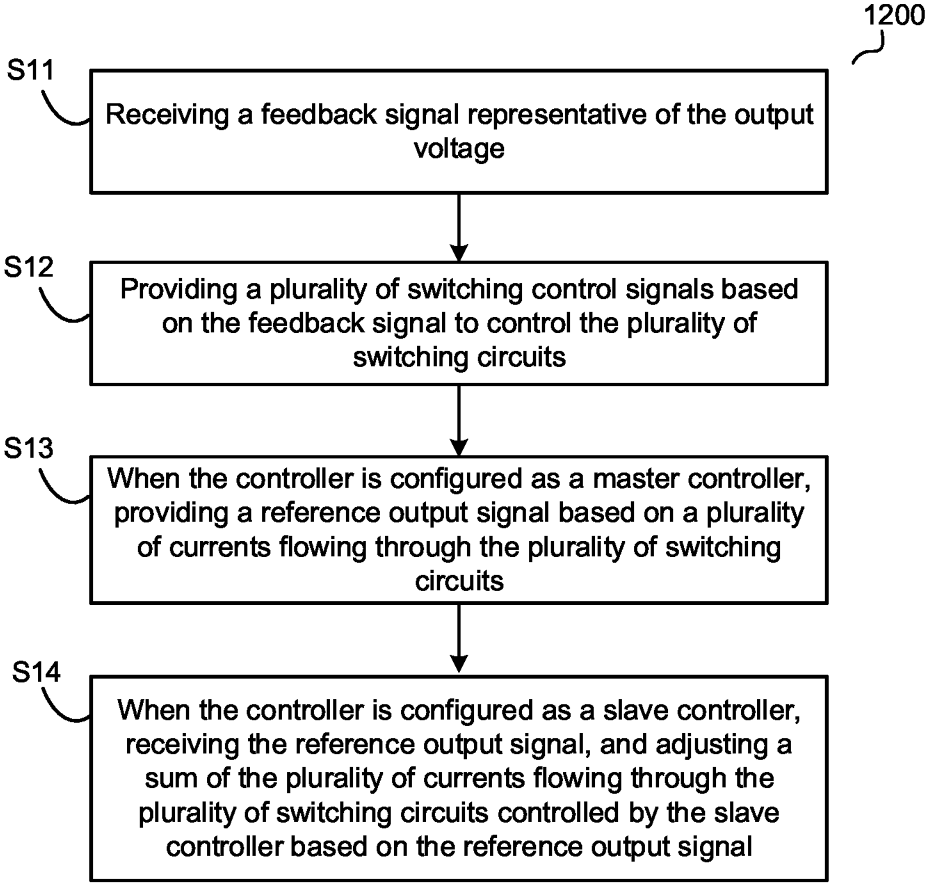
FIG. 12 is a flowchart of a control method 1200 for a controller of a multiphase switching converter in accordance with an embodiment of the present invention.

FIG. 12 a flowchart of a control method 1200 for a controller of a multiphase switching converter in accordance with an embodiment of the present invention. The control method comprises steps S11-S14. The multiphase switching converter has a plurality of switching circuits coupled in parallel to provide an output voltage.

At the step S11, receiving a feedback signal representative of the output voltage.

At the step S12, providing a plurality of switching control signals based on the feedback signal to control the plurality of switching circuits.

At the step S13, when the controller is configured as a master controller, providing a reference output signal based on a plurality of currents flowing through the plurality of switching circuits.

At the step S14, when the controller is configured as a slave controller, receiving the reference output signal, and adjusting a sum of the plurality of currents flowing through the plurality of switching circuits controlled by the slave controller based on the reference output signal.

Note that in the flowchart described above, the functions indicated in the boxes can also occur in a different order than those shown in the figure. Fox example, two boxes presented one after another can actually be executed essentially at the same time, or sometimes in reverse order, depending on the specific functionality involved.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller for a multiphase switching converter with a plurality of switching circuits, comprising:
- a first feedback pin, configured to receive a feedback signal representative of an output voltage of the multiphase switching converter;
- a second feedback pin, configured to receive a reference output signal representing a current flowing through another multiphase switching converter;
- a plurality of switching control pins, configured to provide a plurality of switching control signals based on the feedback signal and a current adjusting signal to control the plurality of switching circuits; and
- a plurality of current sense pins, configured to receive a plurality of current sense signals representative of the plurality of currents flowing through the plurality of switching circuits; wherein
- the controller is configured to provide the current adjusting signal based on the reference output signal and a plurality of currents flowing through the plurality of switching circuits; and wherein
- the controller is configured to balance the plurality of currents flowing through the plurality of switching circuits with the current flowing through the another multiphase switching converter based on the plurality of current sense signals and the reference output signal.

2. The controller of claim 1, wherein the controller further comprising:
- a current adjusting circuit, configured to provide the current adjusting signal; and
- a switching control circuit, configured to generate the plurality of switching control signals to turn on the plurality of switching circuits in sequence based on the current adjusting signal and the feedback signal.

3. The controller of claim 2, wherein when a sum of the feedback signal and the current adjusting signal is less than a voltage reference signal, then one of the plurality of switching circuits is turned on.

4. The controller of claim 1, wherein when an ON-time period of one of the plurality of switching circuits reaches a time threshold, then the one of the plurality of switching circuits is turned off, the time threshold is adjusted based on a current flowing through the one of the plurality of switching circuits.

5. A control method for a multiphase switching converter with a plurality of switching circuits, comprising:

receiving a feedback signal representative of an output voltage of the multiphase switching converter;

receiving a reference output signal representing a current flowing through another multiphase switching converter;

providing a plurality of switching control signals to control the plurality of switching circuits;

providing a current adjusting signal based on the reference output signal and a sum of a plurality of currents flowing through the plurality of switching circuits; and turning on the plurality of switching circuits in sequence based on the current adjusting signal and the feedback signal;

receiving a plurality of current sense signals representative of the plurality of currents flowing through the plurality of switching circuits; and balancing the plurality of currents flowing through the plurality of switching circuits with the current flowing through the another multiphase switching converter based on the plurality of current sense signals and the reference output signal.

6. The control method of claim 5, wherein when a sum of the feedback signal and the current adjusting signal is less than a voltage reference signal, then one of the plurality of switching circuits is turned on.

7. The control method of claim 5, further comprising:

adjusting a time threshold based on a current flowing through one of the plurality of switching circuits; and turning off the one of the plurality of switching circuits when an ON-time period of the one of the plurality of switching circuits reaches the time threshold.

8. A controller for a multiphase switching converter with a plurality of switching circuits, comprising:

a first feedback pin, configured to receive a feedback signal representative of an output voltage of the multiphase switching converter;

a second feedback pin, configured to receive a reference output signal representing a current flowing through another multiphase switching converter;

a plurality of switching control pins, configured to provide a plurality of switching control signals based on the feedback signal, the reference output signal and a plurality of currents flowing through the plurality of switching circuits, to control the plurality of switching circuits; and a current adjusting circuit configured to provide a current adjusting signal to balance the plurality of currents flowing through the plurality of switching circuits with the current flowing through the another multiphase switching converter based on the reference output signal and a sum of the plurality of currents flowing through the plurality of switching circuits.

9. The controller of claim 8, wherein when a sum of the feedback signal and the current adjusting signal is less than a voltage reference signal, then at least one of the plurality of switching circuits is turned on.

10. The controller of claim 8, wherein the controller is configured to adjust the plurality of currents flowing through the plurality of switching circuits in response to the current flowing through the another multiphase switching converter.

* * * * *